(12) United States Patent
Humfeld et al.

(10) Patent No.: US 10,933,598 B2
(45) Date of Patent: Mar. 2, 2021

(54) FABRICATION OF COMPOSITE PARTS HAVING BOTH CONTINUOUS AND CHOPPED FIBER COMPONENTS

(71) Applicant: The Boeing Company, Chicago, IL (US)

(72) Inventors: Keith Daniel Humfeld, Federal Way, WA (US); Scott Hartshorn, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 382 days.

(21) Appl. No.: 15/877,628

(22) Filed: Jan. 23, 2018

(65) Prior Publication Data

US 2019/0224930 A1    Jul. 25, 2019

(51) Int. Cl.
*B29C 70/48*    (2006.01)
*B29C 70/86*    (2006.01)
(Continued)

(52) U.S. Cl.
CPC ............ *B29C 70/48* (2013.01); *B29C 70/081* (2013.01); *B29C 70/54* (2013.01); *B29C 70/86* (2013.01);
(Continued)

(58) Field of Classification Search
CPC ......... B29C 70/48; B29C 70/54; B29C 70/86; B29C 70/08; B29C 45/14311; B29C 45/14; B29C 70/086; B29C 45/14786; B29C 37/0028; B29K 2105/0872; B29K 2105/12; B29K 2307/04; B29K 2101/10; B29K 2101/12; B29K 2105/128; B29L 2031/3076; B32B 2262/106; B32B 2605/18; B32B 27/08; B32B 27/12; B32B 27/00; B32B 27/04; B32B 5/28; B32B 27/18; B32B 2260/021; B32B 2260/045; B32B 2305/08; B29B 11/00; B29B 11/14; B29B 11/16; B60R 19/03; B60R 19/18;
(Continued)

(56) References Cited

U.S. PATENT DOCUMENTS

| 4,123,488 | A | | 10/1978 | Lawson | |
| 4,770,929 | A | * | 9/1988 | Nobumasa | B32B 5/28 |
| | | | | | 442/278 |

(Continued)

FOREIGN PATENT DOCUMENTS

JP    H05269785 A    10/1993

OTHER PUBLICATIONS

European Search Report; Application No. 1827096.1-1019; dated May 28, 2019.
Composite material; Wikipedia; Jan. 8, 2018.

*Primary Examiner* — Camie S Thompson
(74) *Attorney, Agent, or Firm* — Duft & Bornsen, PC (57) ABSTRACT

Systems and methods are provided for fabricating composite parts that include both chopped fiber and continuous fiber components. One embodiment is a method that includes laying up a laminate comprising at least one ply of continuous fiber-reinforced polymer onto a first surface of a mold, filling a cavity of the mold with chopped fibers and resin that contact the laminate, curing the chopped fibers and the laminate together into an integral composite part, and separating the integral composite part from the mold.

23 Claims, 11 Drawing Sheets

(51) Int. Cl.
*B29C 70/08* (2006.01)
*B29C 70/54* (2006.01)
*B32B 27/08* (2006.01)
*B32B 27/12* (2006.01)
*B29L 31/30* (2006.01)
*B29K 105/26* (2006.01)
*B29K 105/08* (2006.01)
*B29K 105/12* (2006.01)
*B29K 307/04* (2006.01)

(52) U.S. Cl.
CPC .............. *B32B 27/08* (2013.01); *B32B 27/12* (2013.01); *B29K 2105/0872* (2013.01); *B29K 2105/12* (2013.01); *B29K 2105/26* (2013.01); *B29K 2307/04* (2013.01); *B29L 2031/3076* (2013.01); *B32B 2262/106* (2013.01); *B32B 2605/18* (2013.01)

(58) Field of Classification Search
CPC ............. B60R 19/24; B60R 2019/1853; F05C 2253/02; F05C 2253/04; F05C 2253/16; F05C 2253/22; Y10T 29/4998
USPC ............. 428/299.1; 442/172, 180, 181, 281; 264/250, 135, 257
See application file for complete search history.

(56) References Cited

U.S. PATENT DOCUMENTS 5,804,511 A 9/1998 Kelman et al.
2014/0190445 A1 7/2014 Reese et al.

\* cited by examiner

FABRICATION OF COMPOSITE PARTS HAVING BOTH CONTINUOUS AND CHOPPED FIBER COMPONENTS

FIELD

The disclosure relates to the field of composite materials, and in particular, to fiber reinforced composite materials.

BACKGROUND

Chopped carbon fiber may be utilized in order to fabricate composite parts. For example, composite parts may be fabricated by acquiring a mass of chopped carbon fibers that are randomly oriented and of short length, impregnating those fibers with a liquid resin, and then hardening the resin to form a composite part. Chopped fiber provides benefits over other fiber-reinforced materials in that chopped fiber composite parts do not require a labor intensive layup process, and also utilize cheaper materials. However, chopped fiber composite parts remain undesirable in certain applications for a number of reasons.

First, chopped fiber composite parts may exhibit less structural strength than desired with respect to forces applied from certain directions. Furthermore, chopped fiber composite parts may exhibit edges and surfaces that are more rough than desired. This roughness is caused by the tips of randomly oriented fibers protruding out of the surface and/or edges of the resulting composite part. These rough edges may be undesirable for aerospace applications because they increase drag, and may also provide a less than desired fit and/or function for the completed part. Furthermore, these rough edges may provide less than desirable electromagnetic properties, owing to the fact that carbon fiber operates as an electrical conductor.

Therefore, it would be desirable to have a method and apparatus that take into account at least some of the issues discussed above, as well as other possible issues.

SUMMARY

Embodiments described herein provide for fiber-reinforced composite parts which are hybrids that comprise both chopped fiber and layers of continuous fiber that are oriented in parallel. One or more exterior surfaces of the composite part is formed by laying up one or more layers of continuous fiber, which are cured together with a mass of chopped fiber. Thus, the resulting composite part exhibits desired surface properties, even though a large amount of chopped fiber may be used.

One embodiment is a method that includes laying up a laminate comprising at least one ply of continuous fiber-reinforced polymer onto a first surface of a mold, filling a cavity of the mold with chopped fibers and resin that contact the laminate, curing the chopped fibers and the laminate together into an integral composite part, and separating the integral composite part from the mold.

A further embodiment is a non-transitory computer readable medium embodying programmed instructions which, when executed by a processor, are operable for performing a method. The method includes includes laying up a laminate comprising at least one ply of continuous fiber-reinforced polymer onto a first surface of a mold, filling a cavity of the mold with chopped fibers and resin that contact the laminate, curing the chopped fibers and the laminate together into an integral composite part, and separating the integral composite part from the mold.

A further embodiment is a manufacture. The manufacture comprises a composite part that includes at least one planar layer of continuous fiber-reinforced polymer disposed at an exterior surface of the composite part, and a mass of chopped fibers that are randomly oriented with respect to each other along all three axes. The mass of chopped fibers is co-cured to the at least one planar layer of continuous fiber-reinforced polymer at a location that is internal to the composite part.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, may be initially laid-up in multiple layers that together form a laminate. Individual fibers within each layer of the laminate are typically aligned parallel with each other, but different layers may exhibit different fiber orientations in order to increase the strength of the resulting composite along different in-plane dimensions. The laminate may include a liquid resin that solidifies at increased temperature in order to harden the laminate into a composite part (e.g., for use in an aircraft). Carbon fiber that has been impregnated with a thermoset resin or a thermoplastic resin (wherein the viscosity changes with temperature) is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may return to liquid form if it is re-heated.

Figure 1:
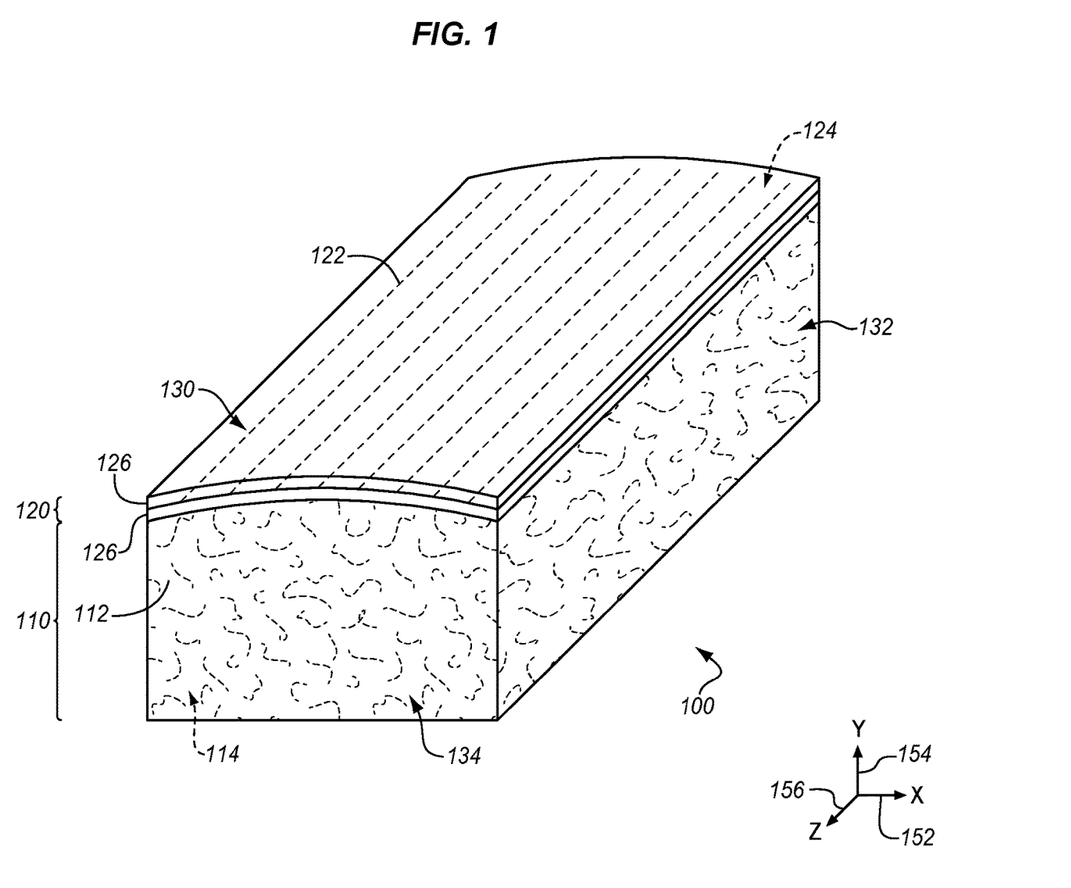
FIG. 1 is a perspective view of a composite part that includes both continuous fibers and randomly oriented fibers in an illustrative embodiment.

FIG. 1 is a perspective view of a composite part 100 that includes both continuous fibers 122 and randomly oriented fibers 112 (e.g., carbon fibers) in an illustrative embodiment. Specifically, region 120 comprises one or more layers 126 (e.g., one to four layers) of fiber reinforced polymer. Layers 126 may also be referred to as plies. For example, region 120 may be formed by one or more layers of Carbon Fiber Reinforced Polymer (CFRP) tape/tows. Each layer 126 includes continuous fibers 122 that are parallel with respect to other fibers in the layer, as well as a hardened polymer of the resin 124. These continuous fibers 122 may extend for feet or even tens of feet within region 120. Region 120 defines an exterior surface 130 of composite part 100, and hence exterior surface 130 exhibits surface qualities such as smoothness associated with laid-up laminates. Because exterior surface 130 is smooth, exterior surface 130 may be particularly suitable for use as an aerodynamic surface. This is true even though composite part 100 includes randomly oriented fibers (e.g., fibers that are randomly oriented along all three axes) as discussed below.

Region 110 is also depicted in FIG. 1. Region 110 is chemically bonded to region 120, and includes randomly oriented fibers 112 (e.g., carbon fibers), as well as resin 114. Randomly oriented fibers 112 are randomly oriented, such that each randomly oriented fiber 112 (or small groups of fibers) may have a random position and/or orientation (along all three axes 152, 154, and 156) with respect to other randomly oriented fibers 112 within region 110. For example, randomly oriented fibers 112 may comprise small chips (e.g., less than a centimeter long) that are randomly oriented, wherein each chip comprises a small group of fibers oriented in parallel with each other. This configuration allows unusable scrap material left over from making carbon parts to be shredded into chips and then reused as randomly oriented fibers. Similar scrap material may be derived from cutting, chopping and/or fracturing composite tape material. Randomly oriented fibers 112 may comprise chopped fibers that are each, for example, shorter than six centimeters (roughly three inches in length). In embodiments where resin 124 and resin 114 are both thermoset resins, region 110 may be co-cured to region 120. In embodiments where resin 124 and resin 114 are both thermoplastic resins, resin 124 and resin 114 may both be cooled from a molten state concurrently, resulting in a single integral body of hardened polymer resin, randomly oriented fibers 112, and continuous fibers 122. Exterior surface 132 and exterior surface 134 are defined by region 110, and thus may include a roughness and electrical conductivity associated with chopped fiber composite parts.

Composite part 100 provides a substantial benefit over prior composite parts, because it utilizes a thin boundary of continuous fiber reinforced polymer. For example the region 120 may be less than fifty thousandths of an inch thick (e.g., between ten and thirty thousandths of an inch). This means that the process of laying up region 120 is exponentially faster than laying up all of composite part 100. At the same time, one or more exterior surfaces of composite part 100 exhibit desirable surface properties associated with composite parts that are laid-up with continuous fiber tape. Composite part 100 also exhibits additional benefits in that region 110 is anisotropic. Thus, even though the strength of region 110 may be less than that of region 120 with respect to certain types/directions of force, region 110 may actually be stronger than region 120 with respect to other types of forces. With composite part 100 fully described, FIGS. 2-3 proceed to illustrate a mold that may be used to fabricate composite part 100.

Figure 2:
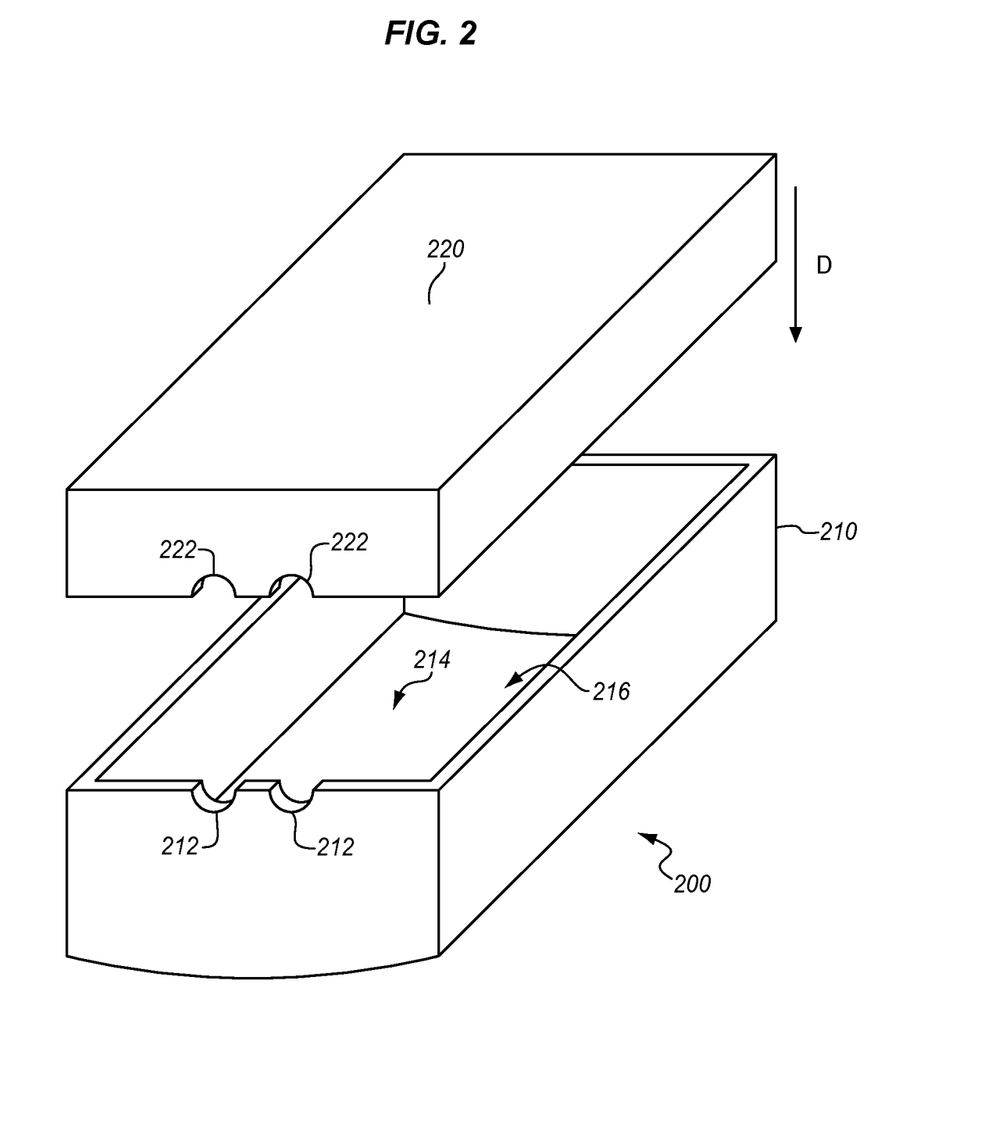
FIG. 2 is a perspective view of an open mold for forming a composite part that includes both continuous fibers and randomly oriented fibers in an illustrative embodiment.

FIG. 2 is a perspective view of a mold 200 that is open for forming a composite part that includes both continuous fibers and randomly oriented fibers in an illustrative embodiment. According to FIG. 2, mold 200 includes first portion 210, and second portion 220. Second portion 220 is partially hollow, and includes cut-outs 222. Similarly, first portion 210 is hollow, defines volume 216, and includes cut-outs 212. Surface 214 of first portion 210 receives a laminate comprising one or more layers of continuous fiber and resin. The laminate may be laid-up while mold 200 is open. Volume 216 receives a mass of chopped fibers and resin while mold 200 is closed.

Figure 3:
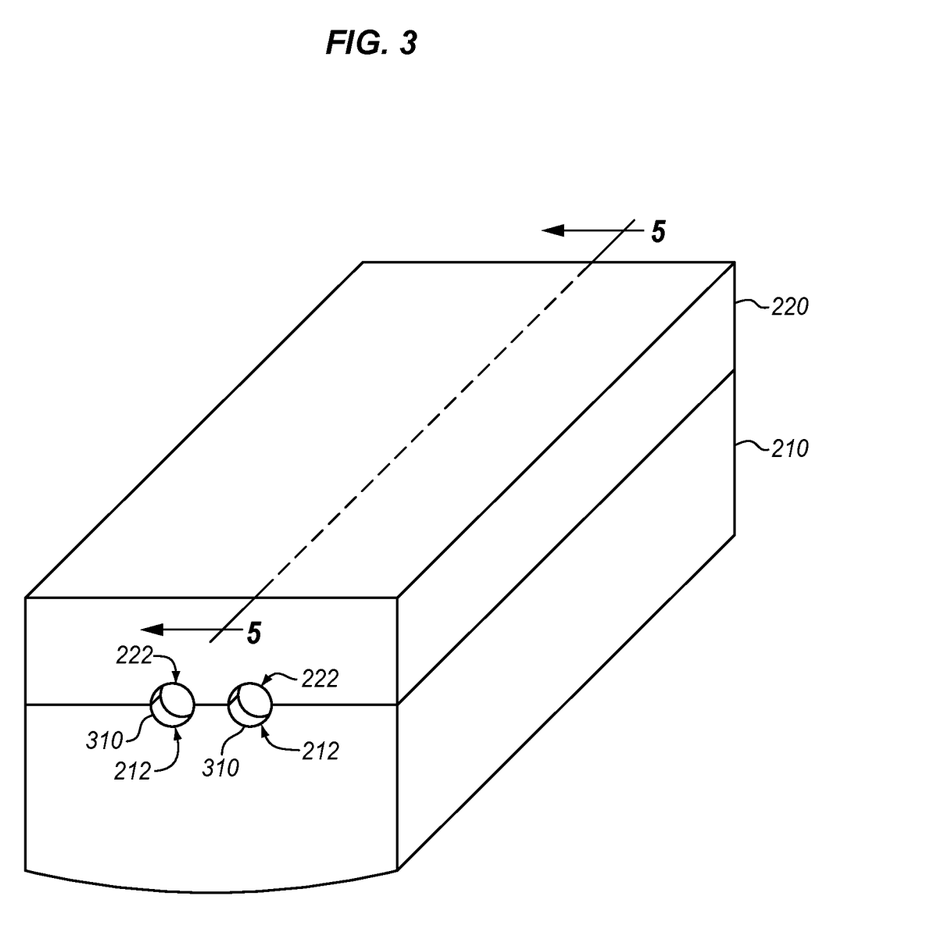
FIG. 3 is a perspective view of a closed mold for forming a composite part that includes both continuous fibers and randomly oriented fibers in an illustrative embodiment.

FIG. 3 is a perspective view of a closed mold for forming a composite part that includes both continuous fibers and randomly oriented fibers in an illustrative embodiment. As shown in FIG. 3, when cut-outs 222 and cut-outs 212 are united, they form ports 310 through which a mass of chopped fibers and resin may enter volume 216.

Illustrative details of the operation of mold 200 will be discussed with regard to FIG. 4. Assume, for this embodiment, that mold 200 is presently open, and is empty awaiting unhardened materials for forming a composite part.

Figure 4:
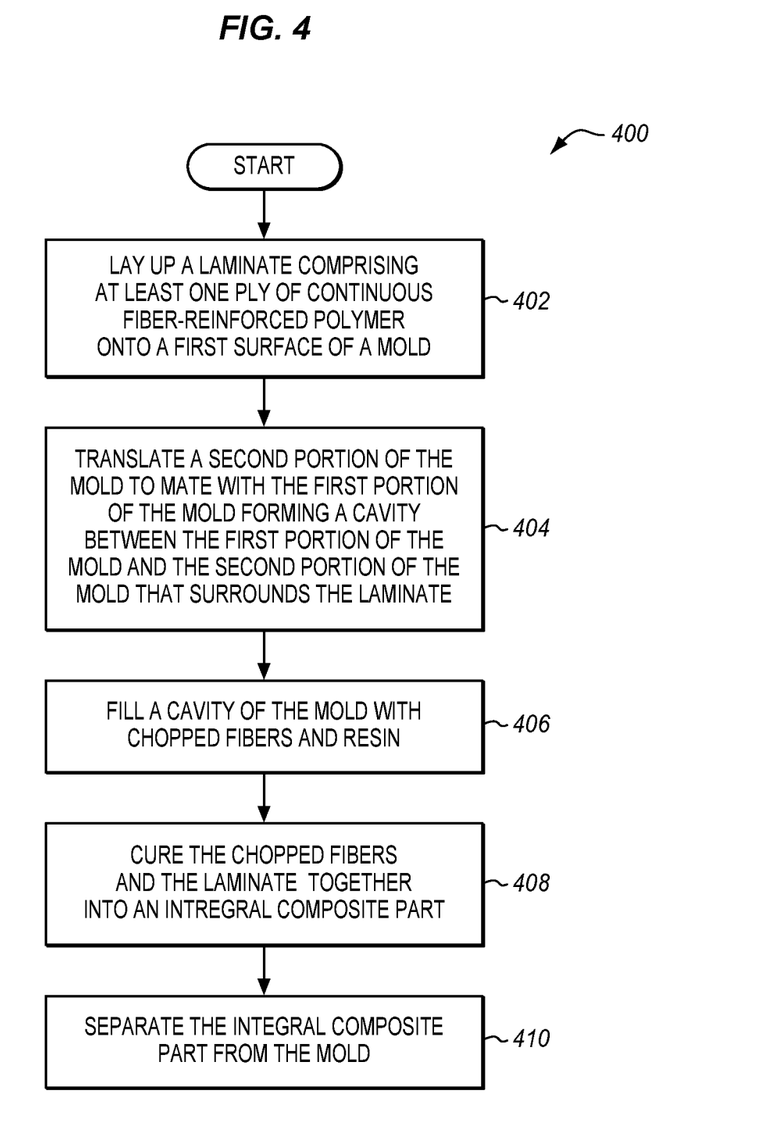
FIG. 4 is a flowchart illustrating a method for fabricating a composite part that includes both continuous fibers and randomly oriented fibers in an illustrative embodiment.

FIG. 4 is a flowchart illustrating a method 400 for fabricating a composite part in an illustrative embodiment. The steps of method 400 are described with reference to mold 200 of FIG. 1, but those skilled in the art will appreciate that method 400 may be performed in other molds and fabrication systems as desired. The steps of the flowcharts described herein are not all inclusive and may include other steps not shown. The steps described herein may also be performed in an alternative order.

Figure 5:
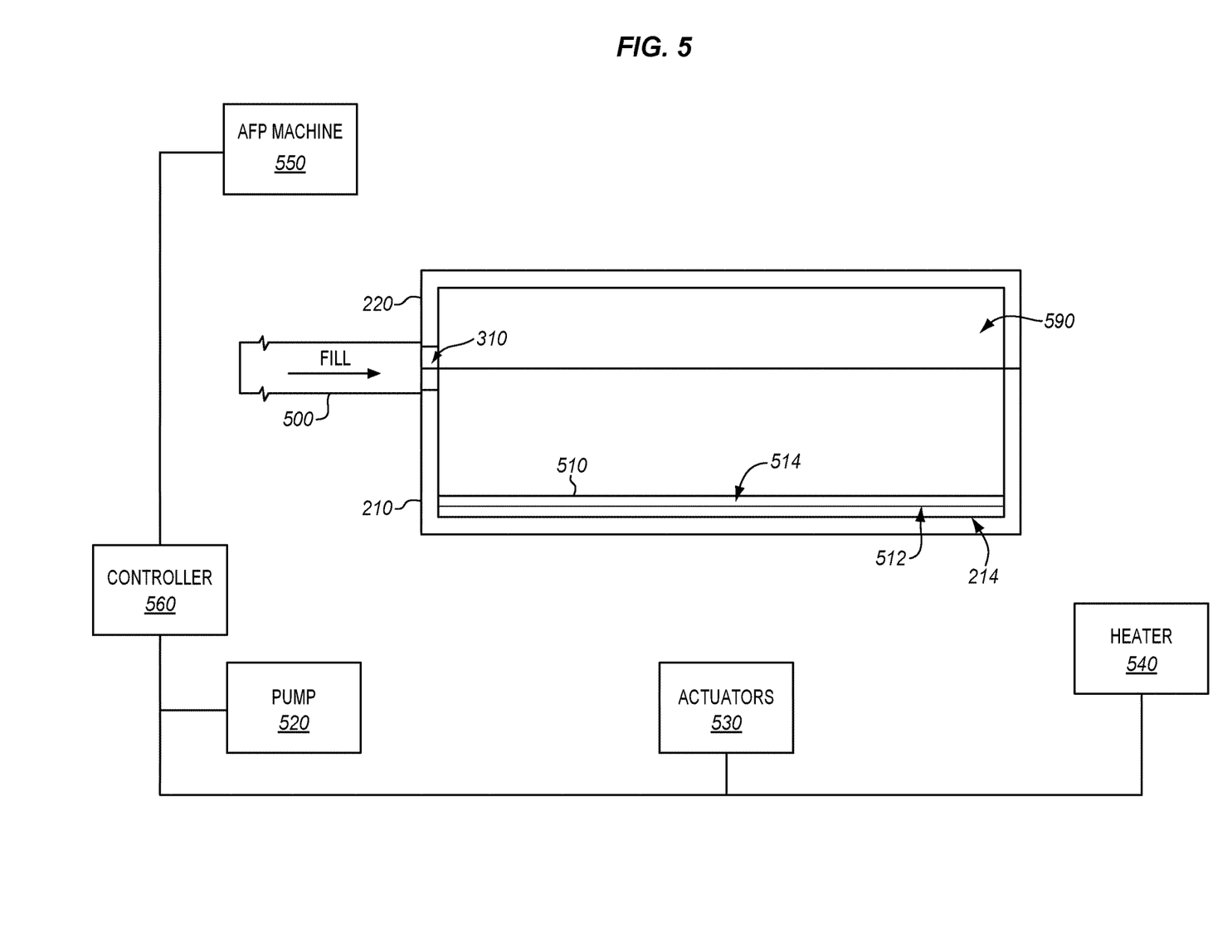
FIGS. 5-8 are cut-through side views illustrating fabrication of a composite part in an illustrative embodiment

In step 402, an Automated Fiber Placement (AFP) machine or other device lays up a laminate comprising at least one ply of continuous fiber reinforced polymer onto a surface 214 of a first portion 210 of a mold 200 (step 402). The laminate provides a smooth surface, and need not necessarily provide substantial structural strength. For example, as shown in FIG. 5 (which is a cut-through side view of mold 200 corresponding with view arrows 5 of FIG. 3), a controller 560 may issue commands according to a Numerical Control (NC) program stored in memory in order to direct an AFP machine 550 in laying up laminate 510 onto surface 214, and then may direct AFP machine 550 to move into a stand-by position when mold 200 is closed. Controller 560 may be implemented, for example, as custom circuitry, as a hardware processor executing programmed instructions, or some combination thereof. As shown in FIG. 5, the laminate 510 includes continuous fibers 512 as well as unhardened (e.g., "green") resin 514.

Mold 200 may be closed after layup of laminate 510 has been completed. That is, method 400 further comprises translating the second portion 220 of mold 200 to mate with the first portion 210 of mold 200, forming a cavity 590 between the first portion 210 of mold 200 and the second portion 220 of mold 200 that surrounds the laminate 510. Cavity 590 is internal to the mold 200 and that communicates with laminate 510 (step 404). Cavity 590 also communicates with port 310. For example, controller 560 may direct actuators 530 to close mold 200, forming cavity 590. Tubing 500 may be attached to port 310 in preparation for filling cavity 590 with a mass of chopped fibers.

Figure 6:
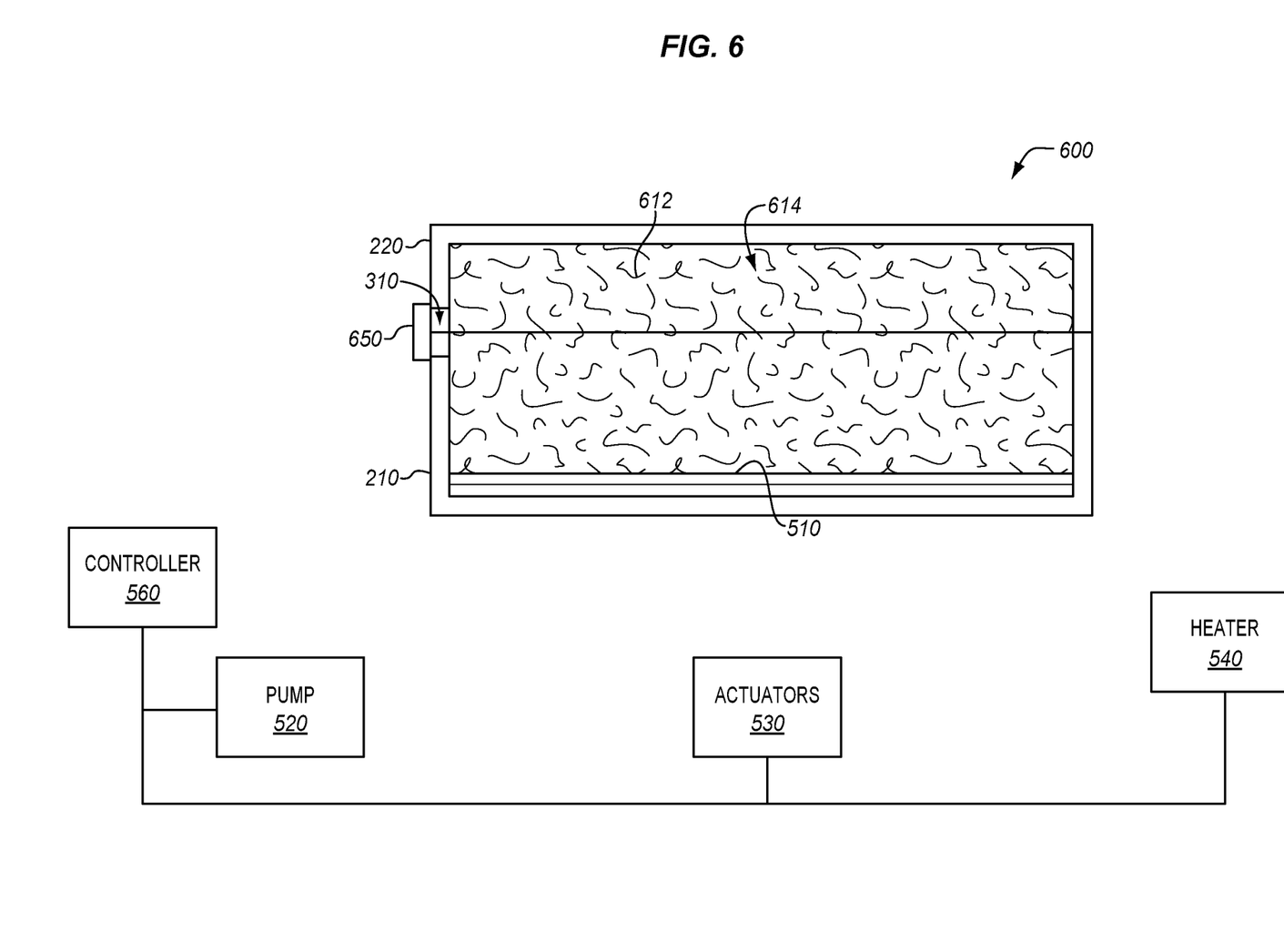

In step 406, controller 560 directs machinery (e.g., a pressurized reservoir or pump) to fill a cavity of the mold 200 with chopped fibers and resin. In this manner, a mass of chopped fibers is injected/inserted into the volume. The fibers are randomly oriented along all three axes (e.g., the fibers are non-planar with respect to each other). This process may comprise controller 560 directing pump 520 to pump a mass of fibers that has been impregnated with resin into cavity 590 via tubing 500. FIG. 6 illustrates that a mass 600 of randomly oriented fibers 612 impregnated with resin 614 within mold 200. In this embodiment, port 310 has been sealed with cap 650 to prevent fibers from escaping when composite part 100 is formed.

Figure 7:
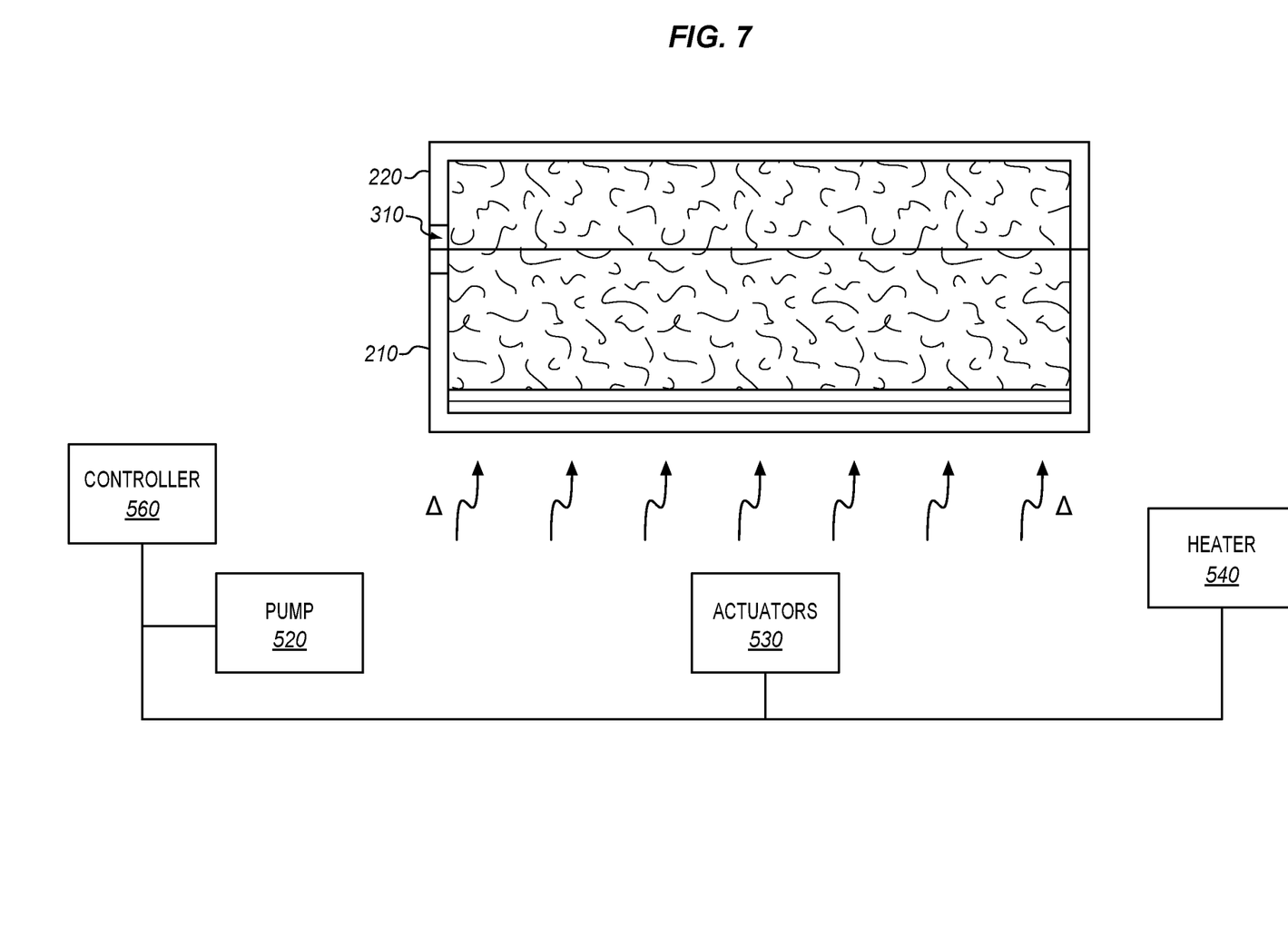

The mass 600 of randomly oriented fibers 612 (i.e., chopped fibers) and the laminate 510 are cured together into an integral part (step 408). For example, if laminate 510 and mass 600 utilize a thermoset resin, then controller 560 may direct heater 540 to apply heat to mold 200 to a processing temperature at which the resin cures (as shown in FIG. 7), causing laminate 510 and mass 600 to co-cure. Alternatively, if laminate 510 and mass 600 utilize a thermoplastic resin, then controller 560 may direct heater 540 to apply heat that fully melts the resin, and then cool the mold 200 below a melting temperature of the resin. This forms the composite part 100.

Figure 8:
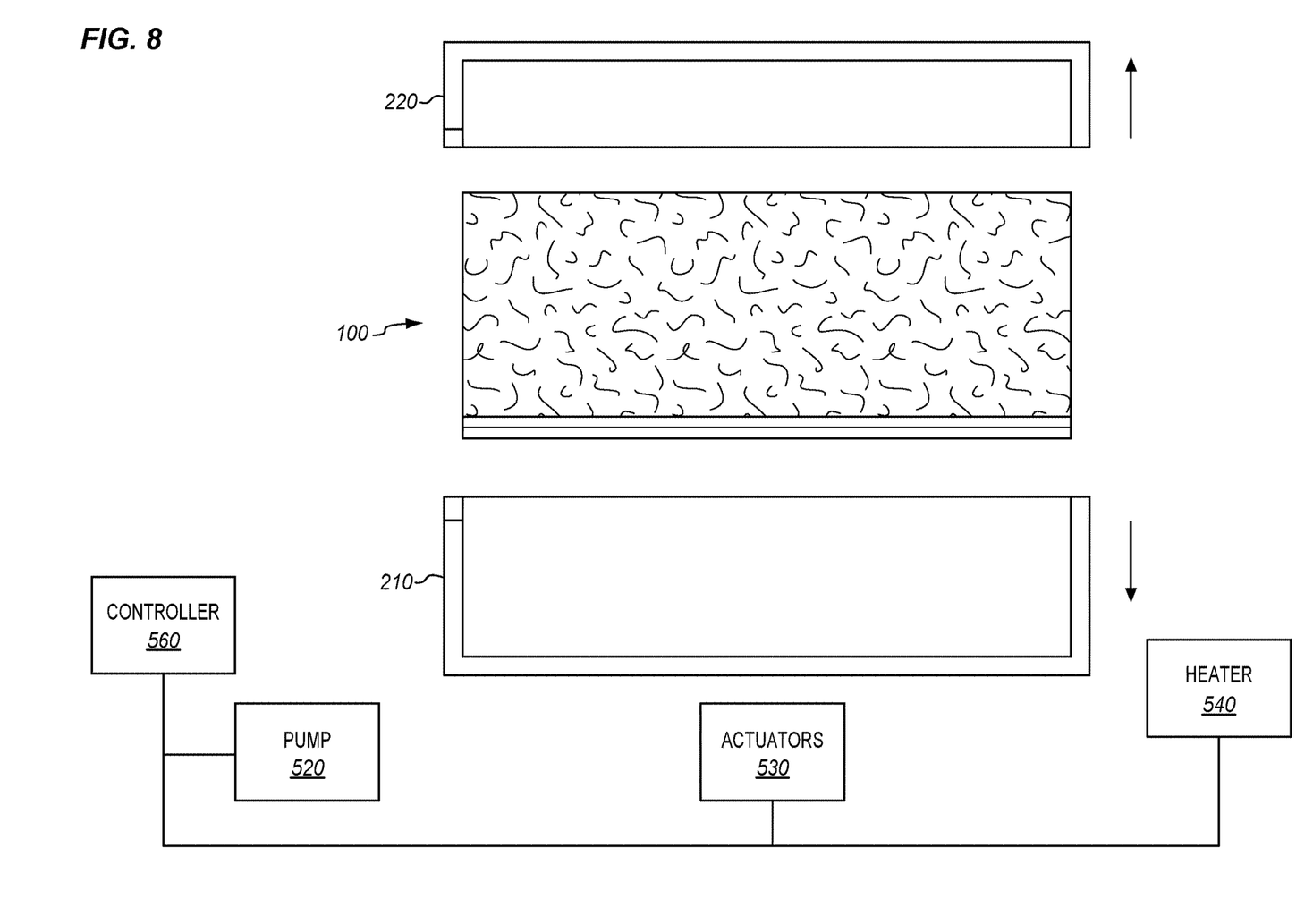

After composite part 100 has been formed, the composite part 100 is separated from the mold 200, and the second portion 220 is separated from the first portion 210 of the mold 200 (step 410). For example, controller 560 may direct actuators 530 to separate first portion 210 from second portion 220 as shown in FIG. 8. This releases the composite part 100 from mold 200, enabling the use of composite part 100 in any desired fabrication and/or assembly process.

In further embodiments, laminate 510 and mass 600 do not include resin when they are placed into mold 200. Resin is then pumped into mold 200 and mold 200 is heated in order to form composite part 100. In still further embodiments, surfaces of mold 200 that are in communication with cavity 590 are treated with a release agent (not shown) in order to facilitate extraction of composite part 100 from mold 1000.

Method 400 allows for the fabrication of composite parts that include both continuous and random fiber within an integral whole. Since the continuous fibers and randomly oriented fibers are cured or hardened together concurrently, interfacial strength between regions of continuous fiber and regions of randomly oriented fiber is increased. Additionally, less expensive randomly oriented fiber may still be utilized in parts that include aerodynamic surfaces.

Figure 9:
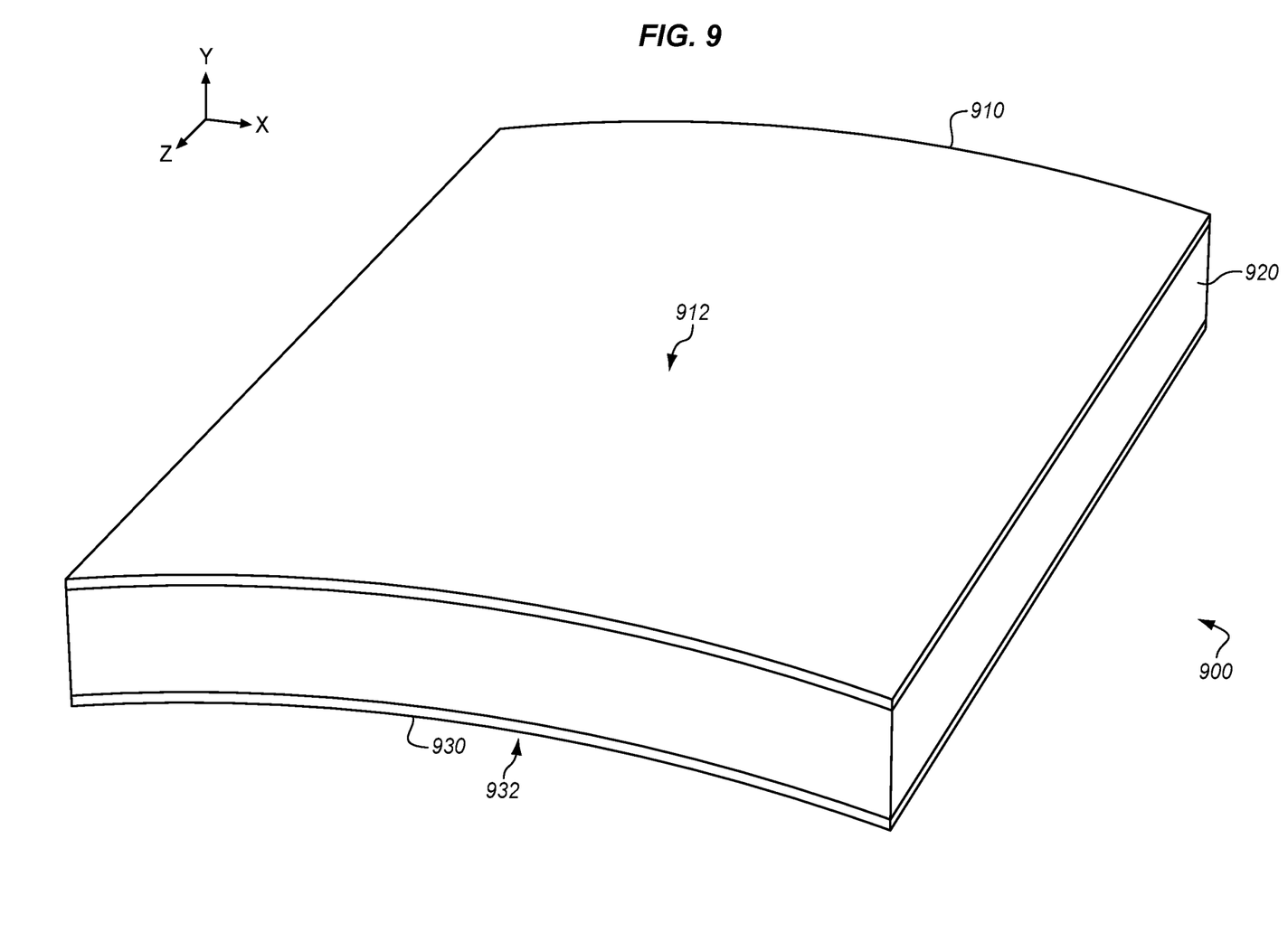
FIG. 9 is a perspective view of a composite part that includes continuous fiber reinforced polymer along multiple exterior surfaces in an exemplary embodiment.

FIG. 9 is a perspective view of a composite part 900 that includes multiple exterior surfaces defined by continuous fiber reinforced polymer, and an inner region comprising randomly oriented fiber reinforced polymer. In this embodiment, exterior surface 912 is defined by region 910 of continuous fiber reinforced polymer, and exterior surface 932 is defined by region 920 of continuous reinforced polymer 930. In contrast, region 920 comprises randomly oriented fiber reinforced polymer. This effectively results in a randomly oriented fiber reinforced polymer core sandwiched between laminate face sheets.

EXAMPLES

In the following examples, additional processes, systems, and methods are described in the context of fabricating composite parts that include continuous fibers and randomly oriented fibers.

Figure 10:
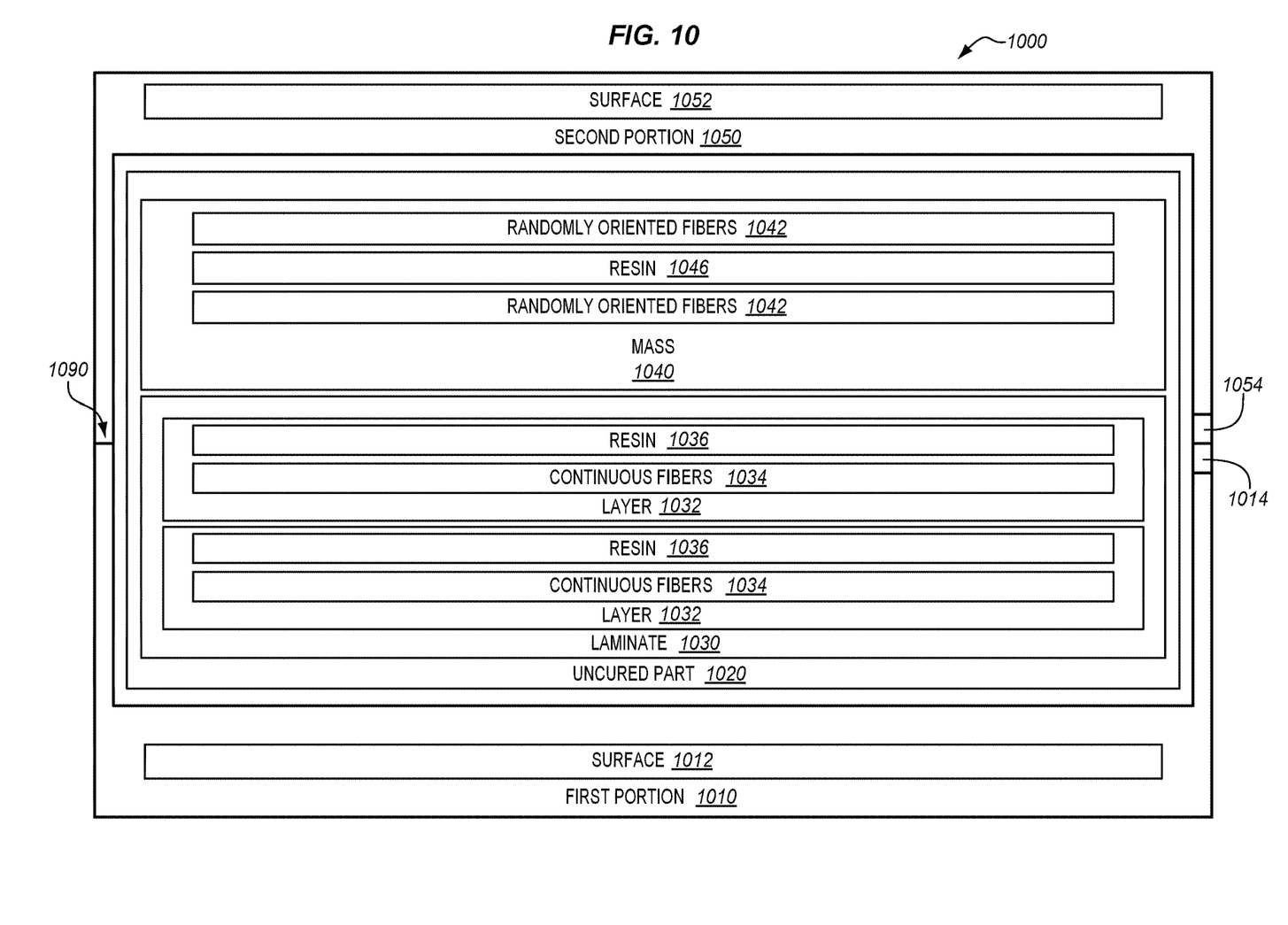
FIG. 10 is a block diagram of a mold that fabricates a composite part in an illustrative embodiment.

FIG. 10 is a block diagram of a mold 1000 that fabricates a composite part in an illustrative embodiment. In this example, mold 1000 includes first portion 1010, which includes surface 1012. Surface 1012 receives a laminate 1030 of an uncured part 1020. Laminate 1030 includes multiple layers 1032 which each comprise continuous fibers 1034 as well as resin 1036. Uncured part 1020 also includes mass 1040 of randomly oriented fibers 1042 and resin 1046. Uncured part 1020 is located within cavity 1090. Mass 1040 is inserted via a port formed by cut-out 1014 of first portion 1010, and cut-out 1054 of second portion 1050. Second portion 1050 mates with first portion 1010 to enclose uncured part 1020. Mass 1040 contacts surface 1052 of second portion 1050.

Figure 11:
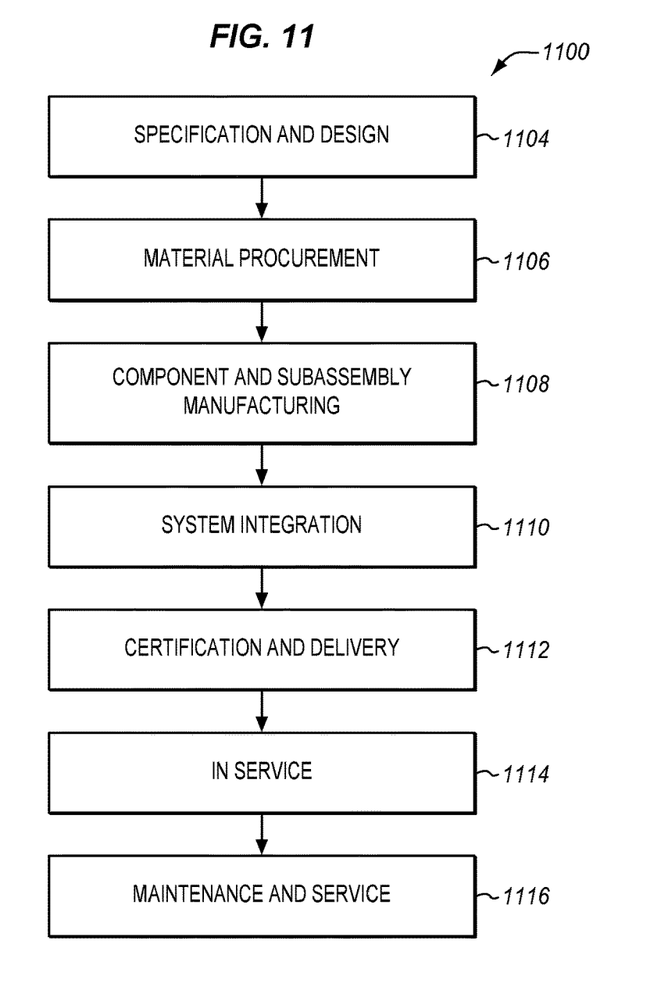
FIG. 11 is a flow diagram of aircraft production and service methodology in an illustrative embodiment.
Figure 12:
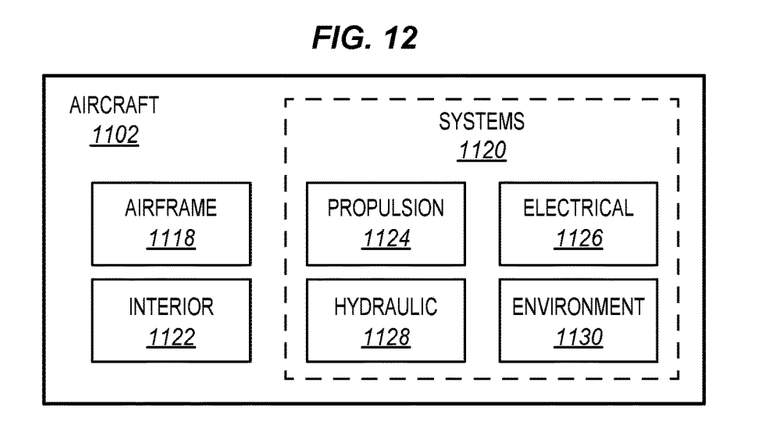
FIG. 12 is a block diagram of an aircraft in an illustrative embodiment.

Referring more particularly to the drawings, embodiments of the disclosure may be described in the context of an aircraft manufacturing and service method 1100 as shown in FIG. 11 and an aircraft 1102 as shown in FIG. 12. During pre-production, illustrative method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116 (which may also include modification, reconfiguration, refurbishment, and so on). Apparatus and methods embodied herein may be employed during any one or more suitable stages of the production and service method 1100 (e.g., specification and design 1104, material procurement 1106, component and subassembly manufacturing 1108, system integration 1110, certification and delivery 1112, service 1114, maintenance and service 1116) and/or any suitable component of aircraft 1102 (e.g., airframe 1118, systems 1120, interior 1122, propulsion 1124, electrical 1126, hydraulic 1128, environmental 1130).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by illustrative method 1100 may include an airframe 1118 with a plurality of systems 1120 and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1100. For example, components or subassemblies corresponding to production stage 1108 may be fabricated or manufactured in a manner similar to components or subassemblies produced while the aircraft 1102 is in service. Also, one or more apparatus embodiments, method embodiments, or a combination thereof may be utilized during the production stages 1108 and 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation, to maintenance and service 1116. For example, the techniques and systems described herein may be used for steps 1106, 1108, 1110, 1114, and/or 1116, and/or may be used for airframe 1118 and/or interior 1122. These techniques and systems may even be utilized for systems 1120, including for example propulsion 1124, electrical 1126, hydraulic 1128, and/or environmental 1130.

In one embodiment, a composite part 100 comprises a portion of airframe 1118, and is manufactured during component and subassembly manufacturing 1108. The composite part 100 may then be assembled into an aircraft in system integration 1110, and then be utilized in service 1114 until wear renders the composite part 100 unusable. Then, in maintenance and service 1116, the composite part 100 may be discarded and replaced with a newly manufactured part. Inventive components and methods may be utilized throughout component and subassembly manufacturing 1108 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising: fabricating a laminate comprising at least one ply of continuous fiber-reinforced polymer onto a first surface of a mold; filling a cavity of the mold with chopped fibers and resin that contact the laminate; fabricating an additional laminate onto a second portion of the mold; hardening the rein, thereby combining the chopped fibers and the laminate and the additional laminate into an integral composite part; and separating the integral composite part from the mold.

2. The method of claim 1 wherein fabricating the laminate onto the first surface of the mold comprises creating the laminate onto the first surface.

3. The method of claim 1 wherein:
the first surface is at a first portion of the mold, hardening the resin comprises heating the resin, the chopped fibers, and the laminate, and the method further comprises:
forming the cavity by translating a second portion of the mold to mate with the first portion of the mold, the cavity existing between the first portion of the mold and the second portion of the mold and surrounding the laminate; and
separating the second portion of the mold from the first portion of the mold after curing the mass of chopped fibers and the laminate together into the integral composite part.

4. The method of claim 3 wherein:
translating the second portion of the mold comprises positioning a first cut-out at the first portion of the mold atop a second cut-out at the second portion of the mold, forming a port that is defined by the first cut-out and the second cut-out and that leads into the cavity.

5. The method of claim 1 wherein fabricating the laminate comprises fabricating a tow that has been pre-impregnated with resin.

6. The method of claim 1 further comprising:
filling the cavity with the resin is performed separately from filling the cavity with the chopped fibers.

7. The method of claim 1 wherein:
the resin is a thermoset resin, and
hardening the resin comprises heating the thermoset resin to a curing temperature.

8. The method of claim 1 wherein:
fabricating the laminate prevents tips of fibers from being exposed at the first surface.

9. The method of claim 1 wherein:
the resin is a thermoplastic resin, and the method further comprises:
cooling the integral composite part after heating, solidifying the thermoplastic resin at the laminate and the chopped fibers.

10. A non-transitory computer readable medium embodying programmed instructions which, when executed by a processor, are operable for performing a method comprising: fabricating a laminate comprising at least one ply of continuous fiber-reinforced polymer onto a first surface of a mold; filling a cavity of the mold with chopped fibers and resin that contact the laminate; fabricating an additional laminate onto a second portion of the mold; hardening the rein, thereby combining the chopped fibers and the laminate and the additional laminate into an integral composite part; and separating the integral composite part from the mold.

11. The medium of claim 10 wherein fabricating the laminate onto the first surface of the mold comprises creating the laminate onto the first surface.

12. The medium of claim 10 wherein:
the first surface is at a first portion of the mold, hardening the resin comprises heating the resin, the chopped fibers, and the laminate, and the method further comprises:
forming the cavity by translating a second portion of the mold to mate with the first portion of the mold, the cavity existing between the first portion of the mold and the second portion of the mold and surrounding the laminate; and
separating the second portion of the mold from the first portion of the mold after curing the mass of chopped fibers and the laminate together into the integral composite part.

13. The medium of claim 12 wherein:
translating the second portion of the mold comprises positioning a first cut-out at the first portion of the mold atop a second cut-out at the second portion of the mold, forming a port that is defined by the first cut-out and the second cut-out and that leads into the cavity.

14. The medium of claim 10 wherein:
fabricating the laminate comprises laying up a tow that has been pre-impregnated with resin.

15. The medium of claim 10 further comprising:
filling the cavity with the resin is performed separately from filling the cavity with the chopped fibers.

16. The medium of claim 10 wherein:
the resin is a thermoset resin, and
hardening the resin comprises heating the thermoset resin to a curing temperature.

17. The medium of claim 10 wherein:
fabricating the laminate prevents tips of fibers from being exposed at the first surface.

18. The medium of claim 10 wherein:
the resin is a thermoplastic resin, and the method further comprises:
cooling the integral composite part after heating, solidifying the thermoplastic resin at the laminate and the chopped fibers.

19. A manufacture comprising: a composite part comprising: a first at least one planar layer of continuous fiber-reinforced polymer fabricated at an exterior surface of the composite part; a mass of chopped fibers that are randomly oriented with respect to each other along all three axes; and a second at least one planar layer of continuous fiber-reinforced polymer fabricated at another exterior surface of the composite part; the mass of chopped fibers is integrated with the first at least one planar layer of continuous fiber-reinforced polymer via hardened resin that binds the chopped fibers together, and is internal to the composite part.

20. The manufacture of claim 19 wherein:
the first at least one layer of planar continuous fiber-reinforced polymer comprises between one and four layers.

21. The manufacture of claim 19 wherein:
the composite part comprises Carbon Fiber Reinforced Polymer (CFRP).

22. The manufacture of claim 19 wherein:
each fiber in the mass of chopped fibers is less than six centimeters long.

23. An aircraft comprising the manufacture of claim 19.

* * * * *